(12) United States Patent
Leang

(10) Patent No.: US 9,713,237 B1
(45) Date of Patent: Jul. 18, 2017

(54) DYNAMICALLY OPTIMIZED BALLAST

(71) Applicant: LOPRESTI SPEED MERCHANTS, Sebastian, FL (US)

(72) Inventor: Bobby Leang, Sebastian, FL (US)

(73) Assignee: LoPresti Speed Merchants, Sebastian, FL (US)

( * ) Notice: Subject to any disclaimer, the term of this patent is extended or adjusted under 35 U.S.C. 154(b) by 0 days.

(21) Appl. No.: 15/294,657

(22) Filed: Oct. 14, 2016

(51) Int. Cl.
| H05B 37/02 | (2006.01) |
| H05B 41/38 | (2006.01) |
| F21V 23/06 | (2006.01) |
| F21V 29/74 | (2015.01) |

(52) U.S. Cl.
CPC ............ *H05B 41/38* (2013.01); *F21V 23/06* (2013.01); *F21V 29/74* (2015.01); *H05B 37/0281* (2013.01)

(58) Field of Classification Search
CPC  H05B 37/02; H05B 37/0209; H05B 37/0281; H05B 41/38; H05B 41/382; H05B 41/2822; H05B 41/2824; H05B 41/2887; H05B 41/2983; F21V 29/74; F21V 23/06
USPC .. 315/56, 63, 72, 77, 82, 83, 291, 307, 308, 315/360, 362
See application file for complete search history.

(56) References Cited

U.S. PATENT DOCUMENTS

| 7,084,587 B2 * | 8/2006 | Archdekin | H05B 41/42 315/309 |
| 2004/0257004 A1 * | 12/2004 | Deurloo | H05B 41/288 315/291 |

* cited by examiner

*Primary Examiner* — Jimmy Vu
(74) *Attorney, Agent, or Firm* — J.C. Patents

(57) ABSTRACT

A dynamically optimized ballast includes a ballast and a circuit board as main components combined together. Said circuit board is provided with a microcontroller, a timer and a current-switching device; wherein said microcontroller is provided with a timed step-up module which can start the timer and maintain a low current output to HID lamp at the time the circuit board is powered, and the timer will transmit a signal to the microcontroller to start the current-switching device and automatically switch to a high current output to HID lamp when a preset time of the timer has been reached. So that this invention can protect HID lamp and extend the service life of HID lamp, even the HID lamp pulsing for a long time, the power source repeated power supply and power out will not cause great damage to HID lamp and it will not be out of function. Besides, this invention enables user to reduce the brightness of HID lamp to reduce the loss of electric power and the deterioration of HID lamp.

4 Claims, 5 Drawing Sheets

DYNAMICALLY OPTIMIZED BALLAST

BACKGROUND OF THE INVENTION

1. Field of the Invention

This invention relates to dynamically optimized ballast, particularly to a ballast having a timer and a current-switching device to allow for multi-step output-levels, thereby eliminating the risk of systematic failures inherent with performing unregulated pulsing functions on HID (High Intensity Discharge) Systems.

2. Description of the Prior Art

At present, common HID lamps require use of ultra-high voltage to produce light from gas atoms excited by electric current. Typically, 12V or 24V DC (Direct Current) voltage is not enough to ignite the arc in the HID lamp, so a ballast is utilized between the HID lamp and Input Power to convert the DC voltage to AC (Alternating Current) voltage, and regulate the current supplied to the lamp throughout its operation.

However, it will generate a lot of problems when using the foregoing ballast with HID lamps of the vehicles or lighting appliances, as described below:

First, when the vehicles or lighting appliances are in use of HID lamps lighting, the foregoing ballast will provide the HID lamp a fixed maximum current resulting in the HID lamp achieving maximum brightness in an instant upon ignition. This standard way of igniting the arc in the HID lamp will result in a steady deterioration of HID lamp and reducing the service life of HID lamp. Moreover, unfortunately, an HID lamp is performing a flashing function common in aviation and automotive industries, the power source's repeated power-on and power-out (also known as "cold start") will cause irreparable damage to the HID lamp and catastrophic failures. For example: during takeoff and landing, an aircraft commonly perform a pulsing action as a pre-caution to increase the visibility of the aircraft by other aircraft and land operations. This pulsing action on a foregoing HID System will have a high failure rate—for this reason, the foregoing ballast not only reduce the service efficiency of HID lamp, it will seriously affect the traffic safety.

Independently, the light production of an HID System commonly exceed the performance requirements that the system is being utilized for. For instance, when an aircraft is in a taxiing-state, the lighting requirement is only so that the environment is knowing of its existence; a sustained maximum brightness will only increase power consumption and deterioration of HID lamp.

For this reason(s), the inventor of this invention, having experience in designing and manufacturing lamps and its related products, understands and researched the problem of the foregoing ballast and hence devised this invention.

SUMMARY OF THE INVENTION

The objective of this invention is to offer a dynamically optimized ballast provided with a timer, a current-switching device, a timed step-up module and a step-down module to protect the HID lamp and extend the service life of HID lamp, especially under a pulsing condition or repeated power-on and power-off, it will not result in systemic damage to the HID lamp and catastrophic failures; moreover, this invention enables user to reduce the brightness of HID lamp to reduce power consumption and minimize HID lamp deterioration.

The dynamically optimized ballast in the present invention includes a ballast and a circuit board as main components combined together, said ballast has a case provided with a power input base and a power output base; said circuit board set inside said case of the ballast, and provided with a power input socket, a power output socket, a microcontroller, a timer and a current-switching device, wherein said power input socket and power output socket are set corresponding to said power input base and power output base of said case, and said microcontroller is electrically connected to the power input socket, the power output socket, the timer and the current-switching device.

The dynamically optimized ballast of present invention, among which said microcontroller is provided with a timed step-up module which can start the timer and maintain a low current output to HID lamp at the time the circuit board is powered, and the timer will transmit a signal to the microcontroller to start the current-switching device and automatically switch to a high current output to HID lamp when a preset time of the timer has been reached.

The dynamically optimized ballast of present invention, among which said microcontroller is provided with a step-down module which can let the microcontroller to start the current-switching device and automatically switch to a low current output to HID lamp by the step-down brightness signal input from the power input socket.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
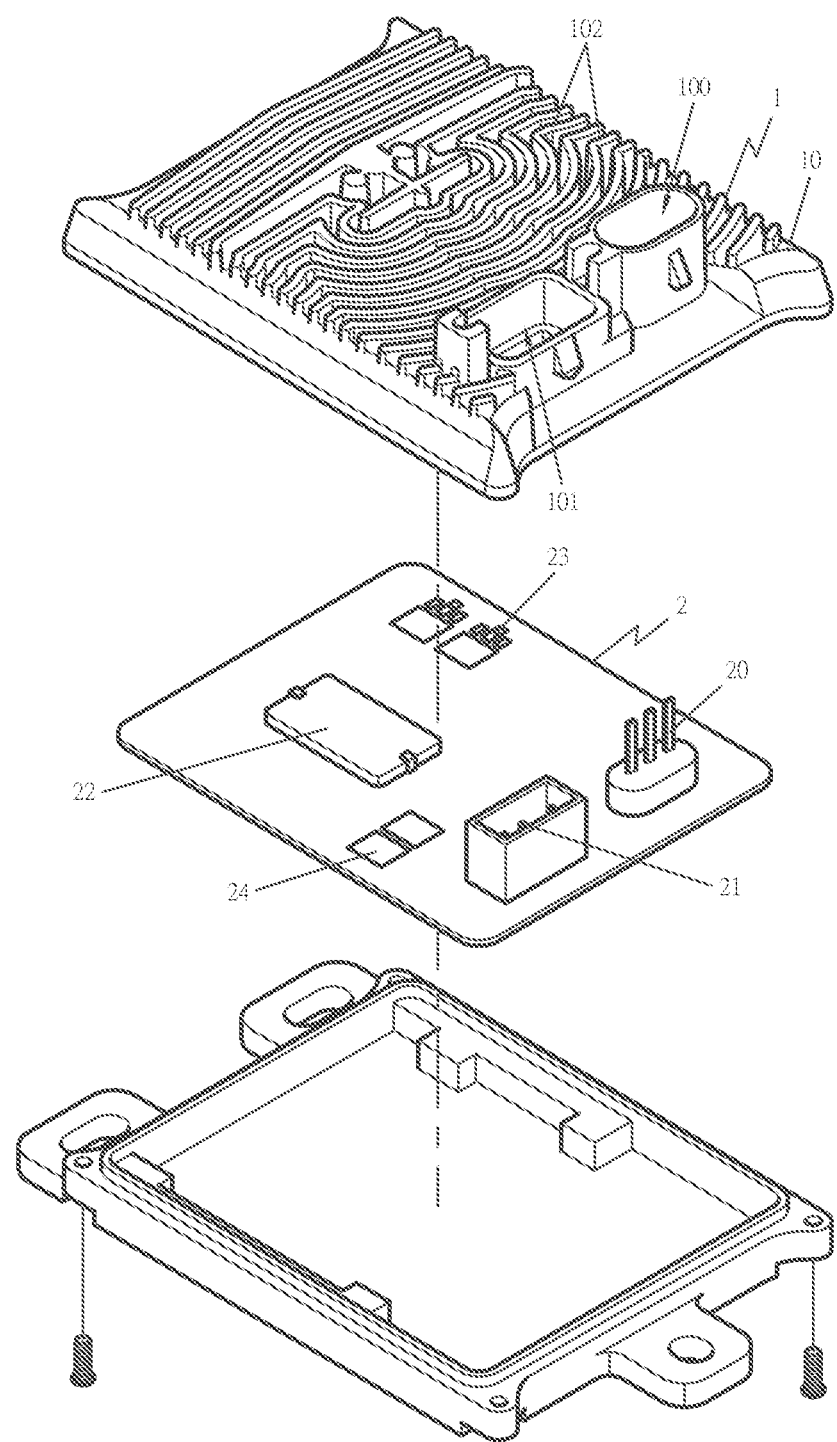
FIG. 1 is an exploded perspective view of the ballast in the present invention.
Figure 2:
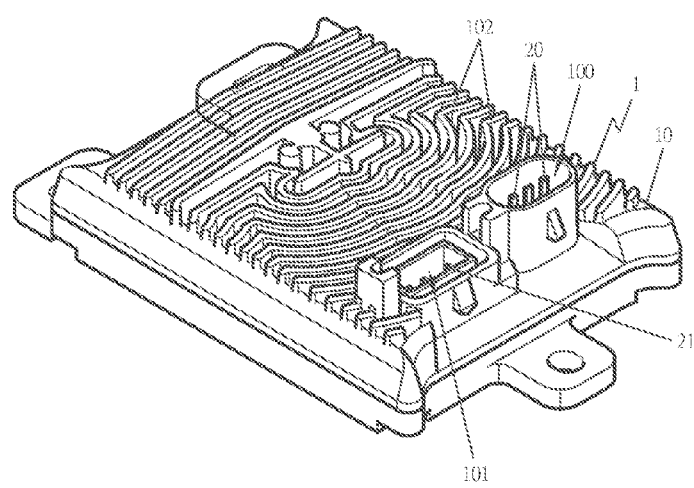
FIG. 2 is a three-dimensional view of the ballast in the present invention.

A preferred embodiment of a dynamically optimized ballast in the present invention, as shown in FIG. 1-5, includes a ballast 1 and a circuit board 2 as main components combined together.

The ballast 1 has a case 10 provided with a power input base 100 and a power output base 101, an outer surface of said case 10 can be set with various modeling cooling member 102 to increase the cooling area and cooling effect of the case 10.

The circuit board 2 set inside said case 10 of the ballast, and provided with a power input socket 20, a power output socket 21, a microcontroller 22, a timer 23 and a current-switching device 24; wherein the power input socket 20 and power output socket 21 are set corresponding to said power input base 100 and power output base 101 of the case 10, and the microcontroller 22 is electrically connected to the power input socket 20, the power output socket 21, the timer 23 and the current-switching device 24.

Figure 3:
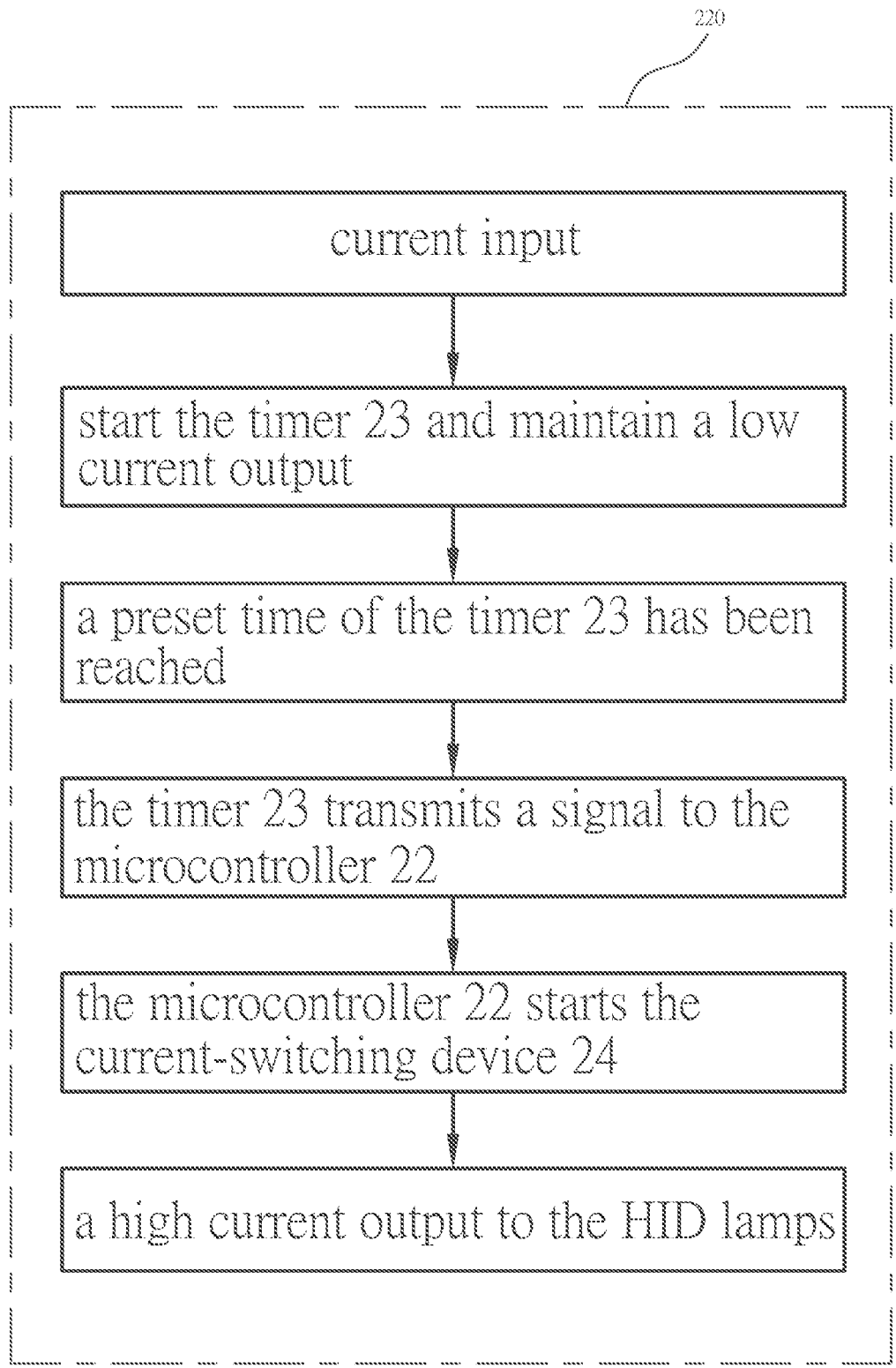
FIG. 3 is a schematic diagram of the timed step-up module in the present invention.

As shown in FIG. 3, said microcontroller 22 is provided with a timed step-up module 220 which can start the timer 23 and maintain a low-current output to HID lamp at the time the circuit board 2 is powered, and the timer 23 will transmit a signal to the microcontroller 22 to start the current-switching device 24 and automatically switch to a high-current output to HID lamp when a preset time of the timer 23 has been reached. For example, the optimized ballast is optimized with a low-current output; a preset high-current output; the optimized preset time in microseconds; the microcontroller 22 will auto provide the optimized low-current output to let the HID lamp produce a lower brightness illumination and start the timer 23 at the time the circuit board 2 is powered, the microcontroller 22 will receive the signal of timer 23 and control the current-switching device 24 automatically switches to high-output to let HID lamp continue to its peak brightness illumination when the timer reaches the optimized preset time.

Figure 4:
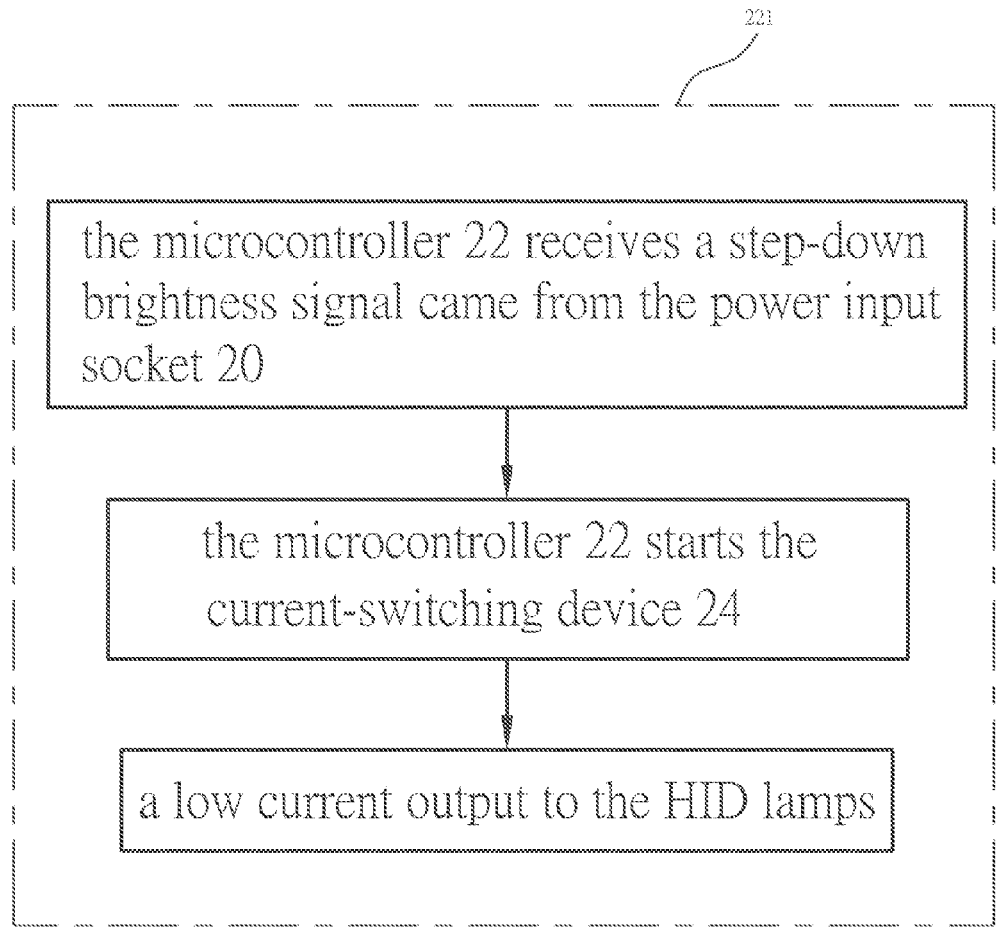
FIG. 4 is a schematic diagram of the step-down module in the present invention.

As shown in FIG. 4, said microcontroller 22 is provided with a step-down module 221 which can let the microcontroller 22 to start the current-switching device 24 and automatically switch to a low-current output to HID lamp when the microcontroller 22 receives a step-down brightness signal came from the power input socket 20. For example, said timed step-up module 220 will start the timer 23 and maintain a low current output to HID lamp at the time the circuit board 2 is powered, if the user switch on the step-down module 221 before the preset time of the timer 23, the microcontroller 22 will not start the current-switching device 24 and continue to provide low-current output to HID lamp when a preset time of the timer 23 has been reached; moreover, when user start the step-down module 221 in high-current output process, the microcontroller 22 will start the current-switching device 24 and automatically switch to a low-current output to HID lamp after receive the step-down brightness signal; the microcontroller 22 will regain the original operation of said timed step-up module 220 (continue to provide low-current output to HID lamp before preset time of the timer 23 and automatically switches to the low-current output to HID lamp after the preset time of the timer 23) until the user turn off the step-down module 221.

Figure 5:
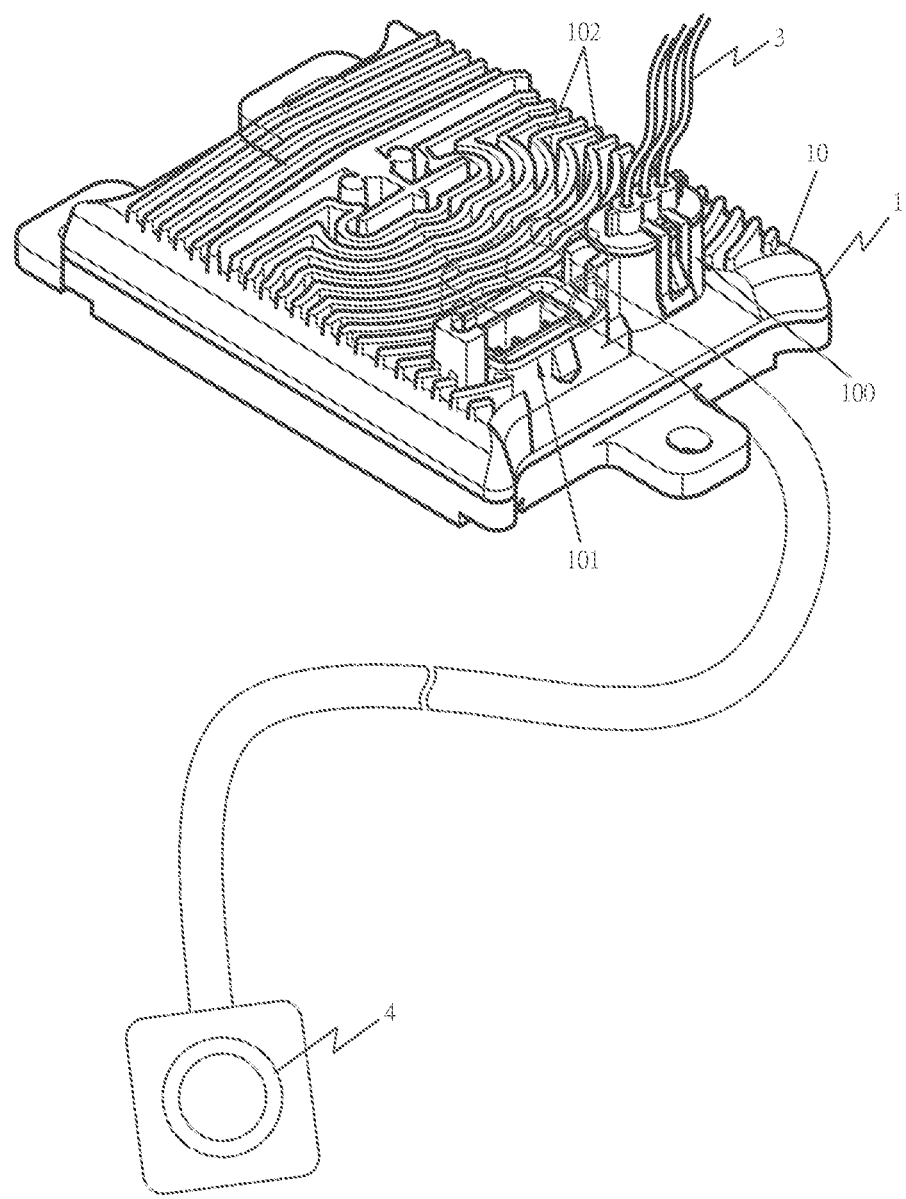
FIG. 5 is a use-case view of the light linking system in the present invention.

As shown in FIG. 5, when using the dynamically optimized ballast of this invention, the power 3 is connected to the power input base 100 of the ballast 1 and connected the HID lamp 4 to the power output base 101 of the ballast 1, so that the ballast 1 can control the input current of HID lamp 4.

Therefore, this invention used the microcontroller 22, the timer 23, the current-switching device 24 and the timed step-up module 220 to protect HID lamp and extend the service life of HID lamp, especially under a pulsing condition or repeated power-on and power-off, it will not result in systemic damage to the HID lamp and catastrophic failures. Furthermore, the step-down module 221 of this invention enables user to reduce the brightness of HID lamp to reduce power consumption and minimize HID lamp deterioration. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

What is claimed is:

1. A dynamically optimized ballast at least comprising:
   a case provided with a power input base and a power output base; and
   a circuit board set inside said case of the ballast, and provided with a power input socket, a power output socket, a microcontroller, a timer and a current-switching device, wherein said power input socket and power output socket are set corresponding to said power input base and power output base of said case, and said microcontroller is electrically connected to the power input socket, the power output socket, the timer and the current-switching device;
   wherein said microcontroller is provided with a timed step-up module which starts the timer and maintains a low current output to HID lamp at the time the circuit board is powered, and the timer transmits a signal to the microcontroller to start the current-switching device and automatically switch to a high current output to HID lamp when a preset time of the timer has been reached.

2. The dynamically optimized ballast according to claim 1, wherein said microcontroller is provided with a step-down module which lets the microcontroller to start the current-switching device and automatically switch to a low current output to HID lamp by the step-down brightness signal input from the power input socket.

3. The dynamically optimized ballast according to claim 1, wherein an outer surface of said case is set with various modeling cooling member to increase the cooling effect of the case.

4. The dynamically optimized ballast according to claim 2, wherein an outer surface of said case is set with various modeling cooling member to increase the cooling effect of the case.

* * * * *